Figure 1:
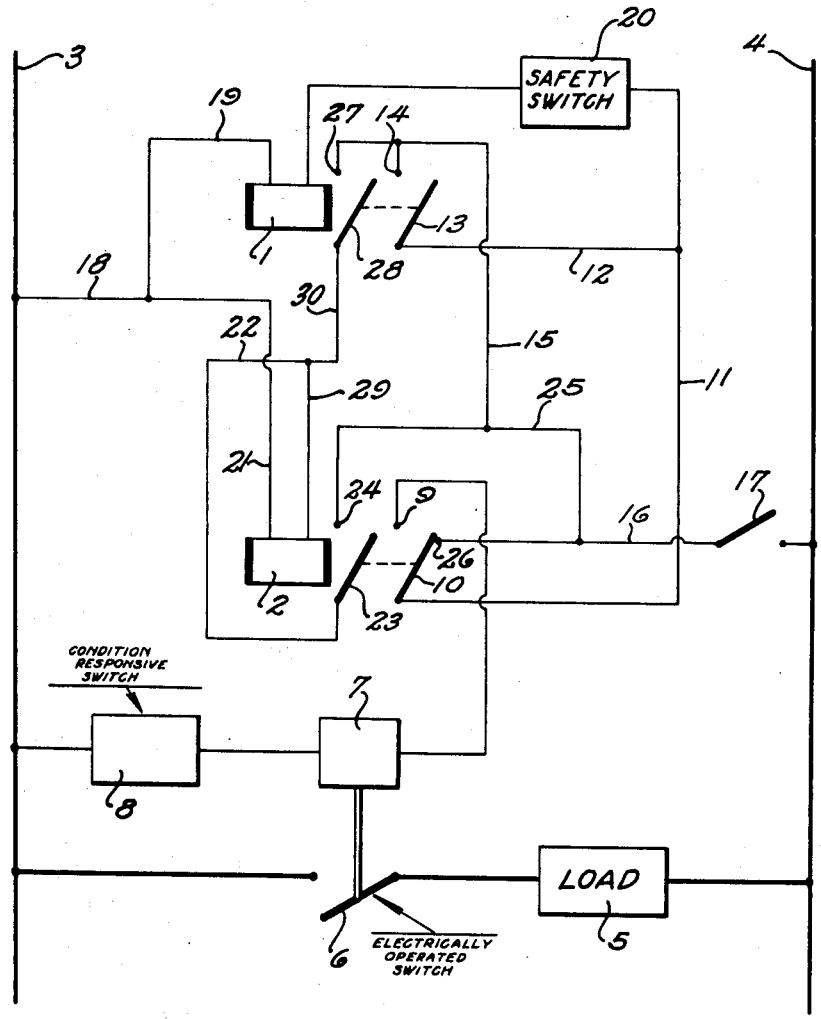

INVENTOR.
HAROLD A. McINTOSH

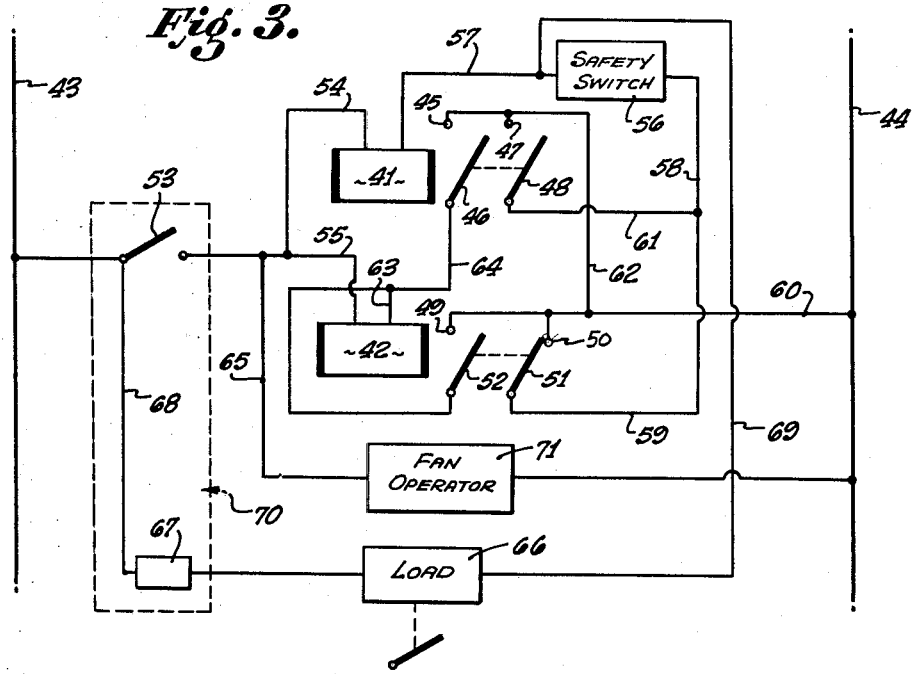
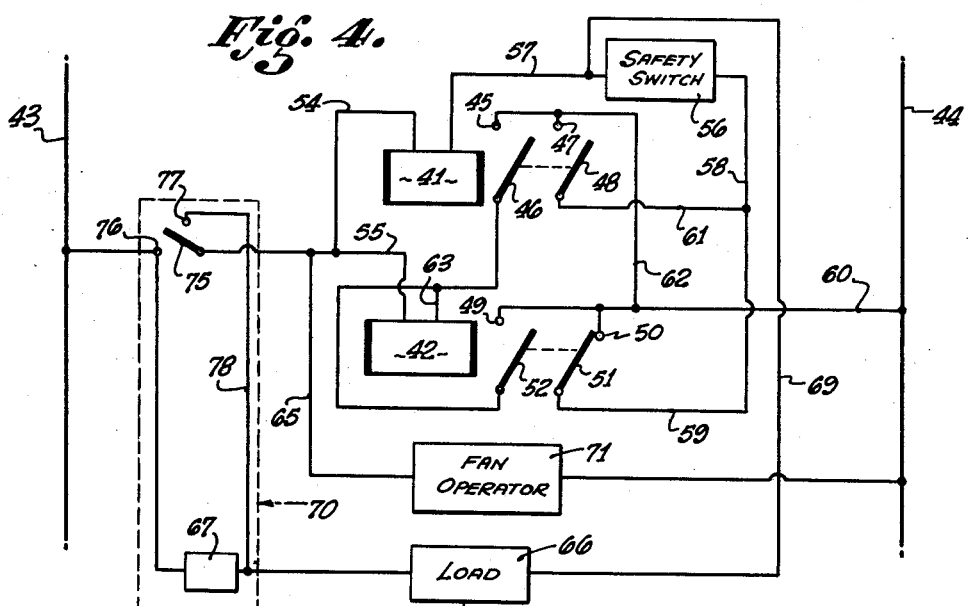

Sept. 15, 1964  H. A. McINTOSH  3,149,267
RESET CIRCUIT FOR ELECTRICAL TRIP-OUT
Original Filed April 15, 1957  3 Sheets-Sheet 3
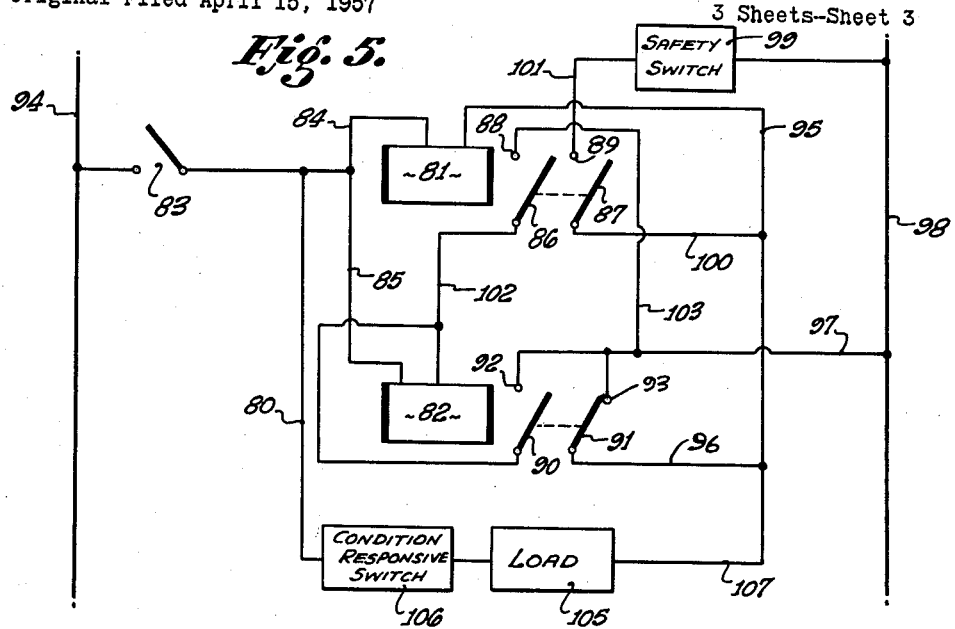
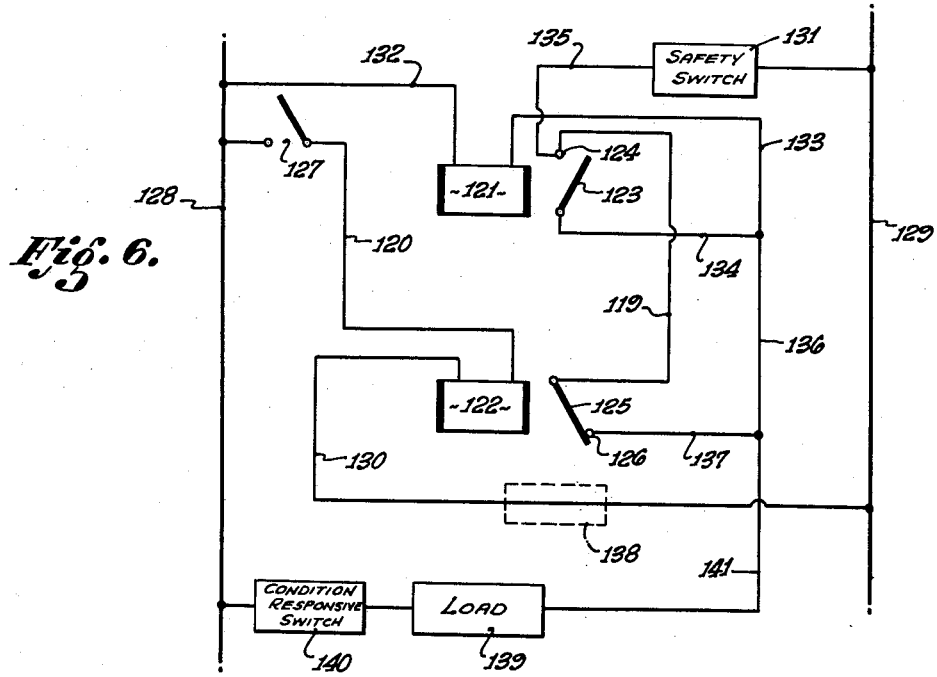
INVENTOR.
HAROLD A. McINTOSH
BY Flam and Flam
ATTORNEYS.

United States Patent Office 3,149,267
Patented Sept. 15, 1964

3,149,267
RESET CIRCUIT FOR ELECTRICAL TRIP-OUT
Harold A. McIntosh, South Pasadena, Calif., assignor to International Telephone and Telegraph Corporation, a corporation of Maryland
Continuation of application Ser. No. 652,948, Apr. 15, 1957. This application Oct. 17, 1960, Ser. No. 63,219
9 Claims. (Cl. 317—157)

This invention relates to a circuit for operation of an electrical load, e.g., a compressor for a refrigerating system, a heater, a cooler, or an air conditioner. Such loads usually are controllable by a condition responsive device, such as temperature, pressure, humidity, or combinations of such conditions. Often, also, a safety circuit controller is provided, by the aid of which unsafe conditions are prevented; for example, such a circuit controller can be used to limit pressures or temperatures.

It is advantageous to ensure that when the safety circuit controller operates to shut off or trip out the load, the load is not automatically reconnected when the circuit controller recloses. Instead, a reset circuit must be operated.

It is one of the objects of this invention to ensure that the load remains deenergized under such circumstances until there is an intentional reenergization, and the safety switch or circuit controller has returned to normal position.

It is another object of this invention to ensure that any equipment failure, such as the failure of any relay to operate, will require a conscious intention reenergization of the load, even if the failure is cured.

It is still another object of this invention to eliminate the necessity of this resetting or restarting operation if the deenergization be due to a power failure.

It is still another object of this invention to make it possible to reset the system from a point remote from the apparatus controlled by the system, and without the need of any special apparatus for the resetting operation.

Still another object of this invention is to provide a system of this character in which convenient use is made of the usual fan switch normally forming a part of a wall thermostat structure.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

This application is a continuation of my prior application, Serial Number 652,948 filed April 15, 1957 for Reset Circuit for Electrical Trip-Out, and which application is a continuation-in-part of my prior application, Serial Number 486,619, filed February 7, 1955, and entitled Reset Circuit for Electrical Trip-Out.

Figure 2:
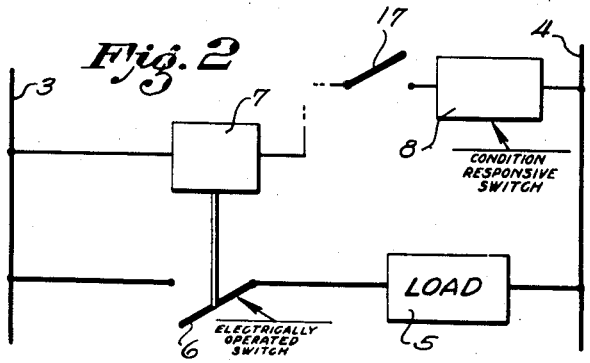

Referring to the drawings:
FIGURE 1 is a wiring diagram of a circuit incorporating the invention;
FIG. 2 is a fragmentary view of a modified form of the invention;
FIG. 3 is a wiring diagram of a circuit incorporating a modified form of the present invention;
FIG. 3a is a diagram illustrating alternate equipment for the circuit shown in FIG. 3;
FIG. 4 is a fragmentary view showing yet another modified form of the present invention; and
FIGS. 5 and 6 are each wiring diagrams of further modifications incorporating the present invention.

The system includes a first relay 1 and a second relay 2. These relays are adapted to be energized from the mains 3 and 4, shown respectively along the left-hand and right-hand sides of the drawing.

FIG. 1 also illustrates a load 5 adapted to be connected across the mains 3 and 4 by the aid of a switch 6. An electrically energized mechanism 7 is utilized to operate the switch 6.

The load 5 may be, for example, an electrically driven compressor for a refrigeration or air conditioning system, a blower, or an electromagnetically operated gas valve.

In order to energize and deenergize the load circuit, there is a main control circuit including the mechanism 7 as well as a condition responsive switch 8. This condition responsive switch may operate in response to an appropriate condition or conditions such as temperature or pressure or the like. In this way, a fuel valve can be opened when more heat is required, or a compressor operated when the temperature of a cooled space reaches a limiting value.

This control circuit can be completed from main 3, switch 8, electrically operated mechanism 7, front contact 9 of relay 2, contact arm 10 of relay 2, connections 11 and 12, arm 13 of relay 1, front contact 14 of relay 1, connections 15 and 16, and a switch 17, to main 4.

In order for the load 5 to be energized, it is essential that the condition responsive switch 8 be closed and that both of the relays 1 and 2 be energized. Furthermore, the switch 17 must be closed.

During the normal operation this control circuit is energized and deenergized by operation of the condition responsive switch 8. The relays 1 and 2 during such normal operation are continuously energized.

Relay 1 is thus energized through connections 18 and 19, relay 1 and safety switch 20, connection 12, front contacts 13 and 14, connections 15, 16 and switch 17.

The safety switch 20 may be of the self-closing and opening type which opens whenever a definite limit of a condition such as pressure, temperature, or the like is reached. This safety switch is included in the circuit for energizing the relay 1. Accordingly, when the safety switch opens, the relay 1 drops out, and the holding circuit is opened at contacts 13 and 14.

The energization of relay 2 is maintained by connections 18, 21, relay 2, connections 29 and 22, relay arm 23, front contact 24, connections 25 and 16, and switch 17.

Assuming that it is desired to initiate the operation of the system from the inactive position shown, it is necessary for this purpose merely to close the switch 17. From this inactive position, the energization of relay 1 is effected as follows: main 3, connections 18 and 19, relay 1, safety switch 20, connection 11, arm 10, back contact 26, connection 16, switch 17, to main 4. It is to be noted that in order to complete the circuit for energizing relay 1, the relay 2 must be deenergized so as to energize relay 1 through the back controls 10 and 26 of the relay 2.

As soon as the relay 1 is energized through this circuit, a holding circuit is completed paralleling the back contacts 10 and 26 of relay 2 as follows: from main 3, connections 18 and 19, relay 1, safety switch 20, connection 12, front contacts 13 and 14 of relay 1, connections 15 and 16, switch 17, to main 4. As soon as relay 1 is energized and its front contact 27 is engaged by the arm 28, the relay 2 is energized as follows: from main 3, connections 18 and 21, relay 2, connections 29 and 30, front contacts 28 and 27, connections 15 and 16, switch 17, to main 4.

Energization of relay 2 causes the main control circuit to be closed as hereinbefore traced, through the condition responsive switch 8, electrically operated mechanism 7, front contacts 9 and 10 of relay 2, front contacts 14 and 13 or relay 1, connections 15 and 16, and switch 17, to main 4.

A holding circuit for relay 2 through its front contacts 23 and 24 is also established.

Now should the safety switch 20 open, the circuit for relay 1 is opened. The load control circuit is deenergized, due to the opening of the front contacts 13 and 14 of relay 1. The relay 2, however, remains energized through its holding contacts 23, 24. Since back contacts 19 and 26 are open under such conditions, it is not possible to reenergize the relay 1 until the switch 17 is first opened to cause deenergization of relay 2. Then when the switch 17 is again closed, the circuits are established as hereinabove traced. Accordingly, the opening the safety switch renders the system inactive even if the safety switch 20 should thereafter close.

In the event of power interruption, the system assumes the inactive position shown in the diagram. Such a power interruption is the equivalent to the opening of the switch 17. Accordingly, when the power is reestablished, the circuit for relay 1 and, later on, the circuit for relay 2 are completed, as hereinabove recited.

Furthermore, in the event either or both of the relays 1 and 2 should be defective and fail, the main control circuit through the electrically operated switch 7 is open-circuited through front contacts 9, 10 or relay 2 or front contacts 13, 14 of relay 1. Operation of the system cannot be reestablished until the switch 17 is first open and then closed.

In FIG. 2, the condition responsive switch is placed in series with the manual switch 17 and out of the control circuit including device 7. In this way, during normal cycling, every time the switch 7 is opened, both relays 1 and 2 are deenergized, and when it is closed, the system is set into operation by first energizing the relay 1, then relay 2, and finally the device 7 is energized to close the main load circuit.

In the form shown in FIG. 3, a first relay 41 and a second relay 42 are provided that operate in much the same manner as the relays 1 and 2 of the form shown in FIG. 1. These relays are adapted to be energized from the mains 43 and 44.

The first relay 41 includes two sets of contacts 45, 47 and contact arms 46, 48. Both sets are normally open. The contact 45 and arm 46 establish an initial energization circuit for the second relay 42, and the contact 47 and arm 48 establish a holding circuit for the first relay 41 in much the same manner as in the previous form.

The second relay 42 includes two electrically connected contacts 49 and 50, one of which 50 is engaged by an arm 51 when the relay 42 is deenergized to establish an initial energization circuit for the first relay 41. Another arm 52 of the second relay 42 cooperates with the contact 49 to establish a holding circuit for the relay 42.

A reset switch 53, when closed, connects the line 43 to branch connections 54 and 55 for the respective relays 41 and 42. Assuming that the reset switch 53 has just been closed, the first relay 41 is energized through a safety switch 56 and the back contact 50 of the second relay 42. The connection is as follows: the reset switch 53, branch connection 54, first relay 41, a connection 57, safety switch 56, connections 58 and 59, to the arm 51 of the second relay 42, back contact 50, and a connection 60, to the line 44.

Energization of the first relay 41 causes engagement of the contacts 45 and 47 by the respective relay arms 46 and 48. A branch connection 61, from a point between connections 58 and 59 to the holding arm 48, provides a holding circuit for the first relay 41, shunting the back contact 50 of the second relay 42. The circuit is as follows: reset switch 53, branch connection 54, first relay 41, connection 57, safety switch 56, connection 58, shunt connection 61, arm 48, contact 47, a connection 62, to the connection 60, to the line 44.

When the first relay 41 is energized, an initial energization circuit for the second relay 42 is completed as follows: reset switch 53, branch connections 55, second relay 42, connections 63 and 64, arm 46 of the first relay, contact 45, and connections 62 and 60, to the other line 44. The holding circuit for the second relay 42 is established from the connection 63 via a connection 65 (located between the connections 63 and 64), arm 52 of the second relay, contact 49, connection 60, to the line 44.

When the first relay 41 becomes energized, a load controlled by a load operator 66 may be operated in accordance with a condition responsive switch 67. The circuit includes, in this instance, the safety switch 56, and the contacts only of the first relay 41 in contrast to the previous form in which the load circuit included contacts of both relays. The circuit is as follows: line 43, through a connection 68 (located on that side of the reset switch 53 adjacent the line 43), condition responsive switch 67, load operator 66, connection 69, safety switch 56, connection 58, shunt connection 61, relay arm 48, contact 47, connections 62 and 60, to the line 44.

Should the safety switch open, the load operator 66 and the first relay 41 are deenergized, and the relay arms 46 and 48 of the first relay disengage their respective contacts 45 and 47. The second relay 42, however, remains energized, since its holding circuit operates independently of the first relay 41 or the safety switch 56. Accordingly, the relay 41 remains deenergized even if the safety switch recloses. Hence, the load also cannot operate even if the safety switch recloses. This follows since the initial energization circuit for the first relay 41 depends upon the second relay 42 being deenergized to cause engagement of arm 51 with contact 50.

By manipulating the reset switch 53, the first relay 41 may be reset if the safety switch 56 permits. Opening the reset switch 53 causes deenergization of the second relay 42 and thus engagement of contact 50. Closing the reset switch 53 repeats the cycle described. Power failure operates in the same manner as manipulation of the reset switch 53. Thus, upon resumption of power, both relays 41 and 42 become energized.

In place of contacts 49 and 50, a single arm may be substituted, and in place of the arms 51 and 52, two contacts may be provided. Accordingly, the present arrangement makes possible a simplification of one of the circuit elements. This is shown in FIG. 3a. Thus, the second relay 42 need be provided with only one arm, but with front and back contacting positions. This results in a definite economy.

The reset switch 53 could be located in the connection 60 without any sacrifice of function. However, the particular arrangement shown permits efficient use of the fan switch, often forming a part of a thermostat structure. The paralleling lead 68 between the reset switch 53 and the condition responsive switch 67 may thus in practice be provided within the common casing 70.

The switch 53, despite its reset functions in the system described, may also control the fan. A fan, indicated by the block 71, is illustrated interposed between the reset or fan switch 53 and the line 44. Optionally, an arm for the relay 42 may be added to control the fan circuit, the second relay 42 always operating whenever the switch 53 is closed.

In FIG. 4, there is illustrated a reset circuit which, in a simple manner, provides the usual two modes of operation of the fan 66. Thus, the fan may be operated only when the condition responsive switch requires operation of the main load or at all times. The reset switch arm 75, which controls the fan circuit, cooperates with either one of two contacts 76 or 77 to provide respectively dependency or independency of the fan circuit with respect to the condition responsive switch, that is, respectively series or parallel circuit relationship.

The contact 76 directly connects to the line 43. When the arm 75 engages this contact 76, operation identical to that described in connection with the form of FIG. 3 is achieved. The other contact 77 is connected to line 43 through the condition responsive switch 67. This is achieved by a lead 78 connected between the contact 77 and the appropriate side of the condition responsive switch 67. Thus, the fan operating circuit, which derives energy from the lead 55 and arm 75, is, in this instance, controlled by the condition responsive switch 67. The fan in this case operates only when the load operates. When the arm 75 engages the contact 76, the fan is continuously operated.

Provision for these two modes of operation of the fan does not detract from the control characteristics of the system. When the condition responsive switch 67 opens as soon as the demand is satisfied, both relays 41, 42 are deenergized. When the condition responsive switch 67 closes, the circuits are automatically reset.

However, if the safety switch 56 opens, manual resetting is still required. The safety switch 56 opens under load conditions, i.e., when the condition responsive switch 67 is in demand position, energizing the load. Despite continued demand, the load intended to satisfy the demand is deenergized by opening of the safety switch. Hence, the demand continues, and the condition responsive switch will not thereafter open and close, which would result in attempted resetting.

Even if the condition responsive switch cycles due to slow cyclically changing external conditions, the load may operate if the safety switch again permits. If the cause of initial opening of the safety switch persists, there may be infrequent frustrated attempts to cause the load to operate, with or without short periods of operation of the load, depending upon the nature of the unsafe condition. This is not a serious drawback.

In the form shown in FIG. 5, first and second relays 81 and 82 are provided as before. As in the form shown in FIG. 3, a reset switch 83 is inserted between the first and second relays 81 and 82 and one of the lines 94. The reset switch controls branch connections 84 to the first relay and 85 to the second relay.

As in the form shown in FIG. 3, the first relay has two arms 86 and 87 engaging contacts 88 and 89 respectively when the first relay 81 is energized. The second relay has two arms 90 and 91. The arm 91 engages the contact 92 when the second relay 82 is energized, and the other arm engages the contact 93 when the relay 83 is deenergized. As in the form shown in FIG. 3, a single arm engaging two contacts may be substituted.

As initial energization circuit for the first relay 81 depends only upon the back contact 93 of the second relay 82. The circuit may be traced as follows: line 94, reset switch 83, branch connection 84, relay 81, connections 95 and 96, arm 91, contact 93, and connection 97, to the other line 98.

When the first relay 81 becomes energized, the second relay 82 is energized, interupting the initial energization circuit for the first relay 81, but a holding circuit for the first relay 81, dependent only on a safety switch 99, is effective. It will be seen that it is unnecessary for the safety switch 99 to be in the initial energization circuit for the first relay provided it is in the holding circuit. The holding circuit may be traced as follows: line 94, reset switch 83, branch connection 84, relay 81, connection 95, a holding connection 100, arm 87, contact 89, connection 101, safety switch 99, to the line 98.

The initial energization circuit for the second relay 82 is established through the other arm 86 of the first relay 81 as follows: line 94, reset switch 83, branch connection 85, relay 82, connection 102, arm 86, contact 88, connection 103, connection 97, to the other line 98.

A holding circuit for the second relay is immediately effective through the arm 90 and the contact 92 as follows: reset switch 83, branch connection 85, second relay 82, connection 102, a holding connection 103, arm 90, contact 92, connection 97, to the line 98.

The load or load operating circuit 105, controlled by a condition responsive switch 106, depends only upon the first relay 81 and the safety switch 99, as in the forms shown in FIGS. 3 and 4. The energization circuit for the load or load operator 105 may be traced as follows: line 94, reset switch 83, branch connection 80, condition responsive switch 106, load 105, connection 107, connection 95, holding connection 100, arm 87, contact 89, connection 101, safety switch 99, to the line 98.

Since the second relay always is energized, except when the reset switch 83 operates, the connection 96 (required for initial energization of the first relay 81) is ineffective to energize the load 105 through the back contact 93 and the connection 97. Accordingly, the energization of the load depends upon the safety switch 99. The condition responsive switch 106 is, in this instance, dependent upon the reset switch 83. If the condition responsive switch 106 were connected directly to the line 94 and the reset switch inadvertently kept open, the load energization circuit could be operative through the back contact of the second relay without dependence on the safety switch. Optionally, the switch 83 could be biased to close to prevent this accidental operation.

Should the safety switch 99 open, the holding circuit for the first relay 81 is interupted and the load circuit is also interrupted. However, the second relay 82 remains energized by virtue of its holding circuit established for its arm 90 and its contact 92. Resetting of the system is necessary.

During resetting, an energization circuit for the load or load operator 105 may momentarily exist through the back contact 93. But this is insignificant.

In the form shown in FIG. 6, a vastly simplified arrangement is provided. However, as in the previous forms, a first relay 121 must be energized in order that the load be operated; the initial energization circuit for the first relay 121 depends upon the second relay 122 being deenergized; the second relay is normally energized but may be deenergized by operation of a reset switch 127; and the holding circuit for the first relay 121 includes a safety switch 131.

Each relay is of simplified construction, there being but one contact and arm for each relay. Nevertheless, operations similar to those described in connection with the previous forms result.

When the reset switch 127 is first opened to initiate operation of the system, the first relay 121 is energized through the arm 125 and the back contact 126 of the second relay 122. In the present instance, this initial energization circuit also includes the safety switch 131, but, as described in connection with previous forms, this is not essential.

The initial energization circuit for the relay 121 is traced as follows: line 128, connection 132, relay 121, connection 133, 136 and 137, back contact 126, arm 125, connections 119 and 135 (interconnected at front contact 124 of the first relay 121), safety switch 131, to the other line 129. It will be noted that this initial energization circuit for the first relay 121 does not include the reset switch 127.

The energization circuit for the second relay 122 is established upon reclosing of the reset switch 127. The energization circuit for the second relay 122 is not dependent upon the first relay. The energization circuit may be traced as follows: line 128, reset switch 127, connection 120, second relay 122, connection 130, to the other line 129.

Although energization of the second relay 122 interrupts the initial energization circuit for the first relay 121, a holding circuit for the first relay 121 is established through its arm 123 and contact 124. The circuit is traced as follows: line 128, connection 132, first relay 121, connection 133, holding connection 134, arm 123, contact 124, connection 135, safety switch 131, to the line 129.

Since the second relay is independent of the first relay, the first relay 121 will not pull in its holding circuit if the arm 125 of the second relay 122 too quickly leaves the contact 126. The necessary time delay is normally provided since upon opening the switch 127, the energization circuit for the first relay 121 is established, and upon closing, the energization circuit for the second relay 122 is established. Hence, unless the reset switch 127 is deliberately manipulated rapidly, the desired operation will result. However, in order to ensure against frustrated attempts to reset the apparatus in this manner, a time delay element, such as a thermistor 138, may be inserted in the energization circuit for the second relay 122.

The load circuit depends upon operation of the first relay 121 and the safety switch 131. The circuit may be traced as follows: line 128, condition responsive switch 140, load or load operator 139, connections 141, 136, holding connection 134, arm 123, contact 124, connection 135, safety switch 131, to the other line 129.

Should the safety switch 131 open, the arm 123 disengages the contact 124 and the circuit for the load or load operator 139 is disconnected. The first relay 121 remains deenergized and the second relay 122 remains energized until the system is reset. Hence, the load remains deenergized even if the safety switch 131 recloses.

The inventor claims:

1. In a control system for a load: a thermostat structure including a manually operable switch and temperature responsive switch, one pole of the manually operable switch being internally connected to one pole of the temperature responsive switch for common connection to one power line; a first relay and a second relay; branch energization circuits for the relays, each connected to the other pole of said manually operable switch; means for initially completing the energization circuit of the first relay to another power line and dependent upon the second relay being deenergized; a holding circuit for the first relay, and including a safety switch responsive to the existence of a condition with which operation of the load is undesirable; means dependent upon the manually operable switch maintaining the second relay energized; and a load operating circuit dependent upon the first relay being energized.

2. In a control system for a load: a first relay and a second relay; manually operable switch means having two positions; means for initiating operation of the first relay and dependent upon the second relay being deenergized; a holding circuit for the first relay, including a safety switch responsive to the existence of a condition with which operation of the load is undesirable; a load operating circuit, including a condition responsive switch and dependent upon the first relay being energized; and means for maintaining the second relay energized independently of said first relay, and including said manually operable switch means and said condition responsive switch in one position of said manually operable switch means, and including said manually operable switch means to the exclusion of said condition responsive switch in the other position of said manually operable switch means.

3. In a control system for a load: a first relay and a second relay; manually operable switch means having two positions; means for initiating operation of the first relay and dependent upon the second relay being deenergized; a holding circuit for the first relay, including a safety switch responsive to the existence of a condition with which operation of the load is undesirable; a load operating circuit, including a condition responsive switch and dependent upon the first relay being energized; means for maintaining the second relay energized independently of said first relay, and including said manually operable switch means and said condition responsive switch in one position of said manually operable switch means, and including said manually operable switch means to the exclusion of said condition responsive switch in the other position of said manually operable switch means; and a fan operating circuit including said manually operable switch means.

4. In a control system for a load: a first relay and a second relay; an energization circuit for the first relay, having two parallel branches, one branch including means dependent upon the second relay being deenergized and the other branch including a safety switch responsive to the existence of a condition with which operation of the load is undesirable and means dependent upon the first relay being energized; an energization circuit for the second relay, including in series a reset switch and two parallel branches, one branch including means dependent upon the first relay being energized and the other branch including means dependent upon the second relay being energized; and a load operating circuit paralleling said first relay.

5. In a control system for a load: a first relay and a second relay; an energization circuit for the second relay and including a reset switch as well as time delay means; means for initiating operation of the first relay, including means dependent upon the second relay being deenergized; means for maintaining the first relay energized independently of said second relay, and including a safety switch responsive to the existence of a condition with which operation of the load is undesirable; and a load operating circuit dependent upon the first relay being in a state of energization.

6. In a lock-out control system having a load, the operation of which under certain conditions creates or increases a hazard, the combination with said load of: a safety device responsive to a condition with which operation of the load is hazardous, and in one state when operation of the load is not hazardous and in another state when operation of the load is hazardous; a first relay and a second relay; each relay having an active state dependent upon application of energy to the relay, and each having an inactive state assumed when not in its active state; reset means having alternate states; circuit means cooperable with a power source operable only when the second relay is in its inactive state and only when said reset means is in one of its states for applying energy to the first relay; holding means for applying energy to said first relay and operable as said first relay assumes its active state, said holding means being dependent upon said safety device being in its said one state and independent of said second relay being in its inactive state; circuit means cooperable with said power source operable only after said first relay assumes its active state for applying energy to said second relay; continued application of energy to said second relay from said power source being dependent upon said reset means being in one of its states, and independent of said safety device; and operating means for said load and dependent upon said first relay being in its active state; continued operation of said load being dependent upon said operating means; movement of said reset means to its inactive state and then to its active state resetting said system, the safety device permitting.

7. In a lock-out control system for a load: a safety device responsive to a condition with which operation of the load is undesirable, and in one state when operation of the load is not undesirable and in another state when operation of the load is undesirable; a first relay and a second relay; each relay having an active state dependent upon application of energy to the relay, and each having an inactive state assumed when not in its active state; reset means having alternate states; means operable only when the second relay is in its inactive state and only when said reset means is in one of its states for applynig energy to the first relay; holding means for applying energy to said first relay and operable as said first relay assumes its active state, said holding means being dependent upon said safety device being in its said one state and independent of said second relay being in its inactive state; means operable as said first relay assumes its active state for initially applying energy to said second relay; holding means for applying energy to said second relay, operable as said second relay assumes its active state, dependent upon said reset means being in one of its states, and independent of said safety device; and operating means for said load and dependent upon said first relay being in its active state; a demand responsive device having one state corresponding to the existence of demand for operation of said load, and another state; said demand responsive device being serially associated with said reset means whereby initial application of energy to said first relay is also dependent upon said demand responsive device being in one state and whereby said holding means for said second relay is also dependent upon said demand responsive device being in its said one state, both relays being thus inactive in the absence of demand.

8. The combination as set forth in claim 7 in which said energy applying means for said first relay is also dependent upon said safety device being in its said one state.

9. The combination as set forth in claim 6 in which said second relay is energized initially in response to the first relay assuming its active state, in which the second relay is provided with holding means for applying energy thereto independently of said first relay being in its active state, and in which said operating means is furthermore dependent upon said second relay being in its active state.

References Cited in the file of this patent

UNITED STATES PATENTS

| | | |
|---|---|---|
| 2,228,997 | Sparrow | Jan. 14, 1941 |
| 2,670,466 | Harper | Feb. 23, 1954 |
| 2,786,989 | Smith | Mar. 26, 1957 |